United States Patent

Park

(10) Patent No.: US 10,036,293 B2
(45) Date of Patent: Jul. 31, 2018

(54) APPARATUS FOR PURIFYING EXHAUST GAS

(71) Applicant: HYUNDAI MOTOR COMPANY, Seoul (KR)

(72) Inventor: Jun Sung Park, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 2 days.

(21) Appl. No.: 15/333,827

(22) Filed: Oct. 25, 2016

(65) Prior Publication Data

US 2017/0167336 A1 Jun. 15, 2017

(30) Foreign Application Priority Data

Dec. 11, 2015 (KR) .................. 10-2015-0177071

(51) Int. Cl.
| | |
|---|---|
| F01N 13/00 | (2010.01) |
| F01N 3/08 | (2006.01) |
| F01N 3/20 | (2006.01) |
| B01D 53/94 | (2006.01) |

(52) U.S. Cl.
CPC ....... *F01N 3/0814* (2013.01); *B01D 53/9418* (2013.01); *B01D 53/9422* (2013.01); *B01D 53/9477* (2013.01); *F01N 3/0821* (2013.01); *F01N 3/0842* (2013.01); *F01N 3/2066* (2013.01); *F01N 13/0093* (2014.06); *B01D 2255/2042* (2013.01); *B01D 2255/2092* (2013.01); *B01D 2255/50* (2013.01); *B01D 2255/904* (2013.01); *Y02T 10/24* (2013.01)

(58) Field of Classification Search
CPC .......................... F01N 2340/02; F01N 2470/20
See application file for complete search history.

(56) References Cited

U.S. PATENT DOCUMENTS

| | | | |
|---|---|---|---|
| 2008/0282670 A1 | 11/2008 | McCarthy, Jr. et al. | |
| 2014/0090362 A1* | 4/2014 | Eckhoff | F01N 3/0821 |
| | | | 60/274 |

FOREIGN PATENT DOCUMENTS

| | | | |
|---|---|---|---|
| JP | 2001000863 A | * | 1/2001 |
| JP | 3846139 B2 | | 11/2006 |
| JP | 2007-270645 A | | 10/2007 |
| JP | 4020054 B2 | | 12/2007 |
| JP | 2015-187404 A | | 10/2015 |

OTHER PUBLICATIONS

Machine translation of JP 2001000863 A, accessed Dec. 20, 2017.*

* cited by examiner

*Primary Examiner* — Jonathan Matthias

(57) ABSTRACT

An apparatus for purifying an exhaust gas includes an engine, an exhaust pipe, a first lean NOx trap (LNT) adapted to absorb nitrogen oxide (NOx) contained in the exhaust gas, to release the absorbed NOx, and to reduce the NOx contained in the exhaust gas or the released NOx or to generate ammonia ($NH_3$), a second LNT adapted to absorb the NOx, to release the absorbed NOx, and to reduce the NOx contained in the exhaust gas or the released NOx or to generate the $NH_3$, and a selective catalytic reduction (SCR) catalyst adapted to temporarily absorb the $NH_3$ and to reduce the NOx contained in the exhaust gas, wherein the second LNT is positioned such that an average temperature of the second LNT is lower than that of the first LNT by 50-150° C. based on an average temperature of the exhaust gas.

9 Claims, 3 Drawing Sheets

APPARATUS FOR PURIFYING EXHAUST GAS

CROSS-REFERENCE TO RELATED APPLICATION

This application claims the benefit of priority to Korean Patent Application No. 10-2015-0177071, filed with the Korean Intellectual Property Office on Dec. 11, 2015, the entire contents of which are incorporated herein by reference.

TECHNICAL FIELD

The present disclosure relates to an apparatus for purifying an exhaust gas. More particularly, the present disclosure relates to maximizing a purifying of nitrogen oxide contained in an exhaust gas at a quick acceleration condition or a high load condition.

BACKGROUND

Generally, exhaust gas flowing out from an engine through an exhaust manifold is driven into a catalytic converter mounted at an exhaust pipe, and is purified therein. After this step, the noise of the exhaust gas is decreased while passing through a muffler and then the exhaust gas is emitted into the outside air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide and hydrocarbons (HC) are supplied to the exhaust gas, the NOx contained in the exhaust gas is reduced in the DeNOx catalyst through an oxidation-reduction reaction with the reducing agents.

Recently, a lean NOx trap (LNT) catalyst is used as such a DeNOx catalyst. The LNT catalyst absorbs the NOx contained in the exhaust gas when air/fuel ratio is lean, and releases the absorbed NOx and reduces the released nitrogen oxide and the nitrogen oxide contained in the exhaust gas when the air/fuel ratio is rich.

If a temperature of the exhaust gas, however, is high (e.g., the temperature of the exhaust gas is higher than 400° C.), the LNT cannot purify the nitrogen oxide contained in the exhaust gas. Particularly, if a vehicle is accelerated quickly or runs at a high load condition, the temperature of the exhaust gas is high and the LNT disposed closely to the engine cannot purify the nitrogen oxide in the exhaust gas. In addition, since a flow of the exhaust gas is large at the quick acceleration condition or the high load condition, NOx exhausted to the exterior of the vehicle may be increased. Therefore, a purifying of the nitrogen oxide may be deteriorated.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus of purifying an exhaust gas having advantages of improving purifying performance of exhaust gas at an entire driving region of a vehicle by disposing a first LNT close to an engine, disposing a second LNT far from the engine, and disposed a selective catalytic reduction (SCR) catalyst at a rearmost of the apparatus. In this case, three DeNOx catalysts are in charge of different temperature regions of the exhaust gas.

An apparatus of purifying an exhaust gas according to an exemplary embodiment of the present disclosure may include: an engine generating power by burning mixture of air and fuel and exhausting the exhaust gas generated at combustion process to the exterior thereof through an exhaust pipe; a first lean NOx trap (LNT) mounted on an exhaust pipe downstream of the engine, and adapted to absorb nitrogen oxide (NOx) contained in the exhaust gas at a lean air/fuel ratio, to release the absorbed NOx at a rich air/fuel ratio, and to reduce the NOx contained in the exhaust gas or the released NOx using a reducing agent including carbon or hydrogen contained in the exhaust gas or to generate ammonia ($NH_3$); a second LNT mounted on the exhaust pipe downstream of the first LNT, and adapted to absorb the NOx contained in the exhaust gas at the lean air/fuel ratio, to release the absorbed NOx at the rich air/fuel ratio, and to reduce the NOx contained in the exhaust gas or the released NOx using the reducing agent including carbon or hydrogen contained in the exhaust gas or to generate the $NH_3$; and a selective catalytic reduction (SCR) catalyst mounted on the exhaust pipe downstream of the second LNT, and adapted to temporarily absorb the $NH_3$ generated at the first LNT or the second LNT and to reduce the NOx contained in the exhaust gas by reacting the absorbed $NH_3$ with the NOx contained in the exhaust gas, wherein the second LNT is positioned such that an average temperature of the second LNT is lower than that of the first LNT by 50° C.-150° C. based on an average temperature of the exhaust gas.

A desulfurization start temperature of the second LNT may be lower than that of the first LNT.

A desulfurization start temperature of the second LNT may be lower than that of the first LNT by 50° C.-150° C.

The first and second LNTs may include barium Ba respectively, wherein a barium amount in the second LNT is 75% of that in the first LNT or less.

The first and second LNTs may respectively include any one of alkali metal including K, Na, Li, and Cs, alkaline earth metal including Ba and Ca, rare earth metal including iridium Ir and La, and noble metal including Pt, Pd, and Rh or combination thereof.

The SCR catalyst may include any one of a zeolite catalyst and a metal catalyst supported on a porous alumina or combination thereof.

At least one element including Cu, Pt, Mn, Fe, Co, Ni, Zn, Cs, and Ga may be ion-exchanged in the zeolite catalyst.

At least one metal including Pt, Pd, Rh, Ir, Ru, W, Cr, Mn, Fe, Co, Cu, Zn, and Ag may be supported on the porous alumina in the metal catalyst supported on the porous alumina.

The apparatus may further include a particulate filter mounted on the exhaust pipe between the first LNT and the second LNT and adapted to trap particulate matter contained in the exhaust gas.

As described above, the exemplary embodiment of the present disclosure may improve purifying performance of exhaust gas at an entire driving region of a vehicle by disposing a first LNT (LNT) close to an engine, disposing a second LNT far from the engine, and disposed a selective catalytic reduction (SCR) catalyst at a rearmost of the apparatus. In this case, three DeNOx catalysts are in charge of different temperature regions of the exhaust gas.

Particularly, the NOx contained in the exhaust gas of low temperature is removed by the first LNT, the NOx contained in the exhaust gas of high temperature is removed by the second LNT, and the NOx that is not removed by the first and second LNTs is removed by the SCR catalyst based on the temperature of the exhaust gas at an outlet of an exhaust manifold. Therefore, purifying performance of the NOx may be greatly improved. In addition, even though the vehicle is accelerated quickly or runs at a high load condition, purifying performance of the NOx may not be deteriorated.

Other effects obtainable or predictable from an exemplary embodiment of the present disclosure will be explicitly or implicitly described in a DETAILED DESCRIPTION section. That is, various effects predictable from an exemplary embodiment of the present disclosure will be described in the DETAILED DESCRIPTION section.

DETAILED DESCRIPTION

Figure 1:
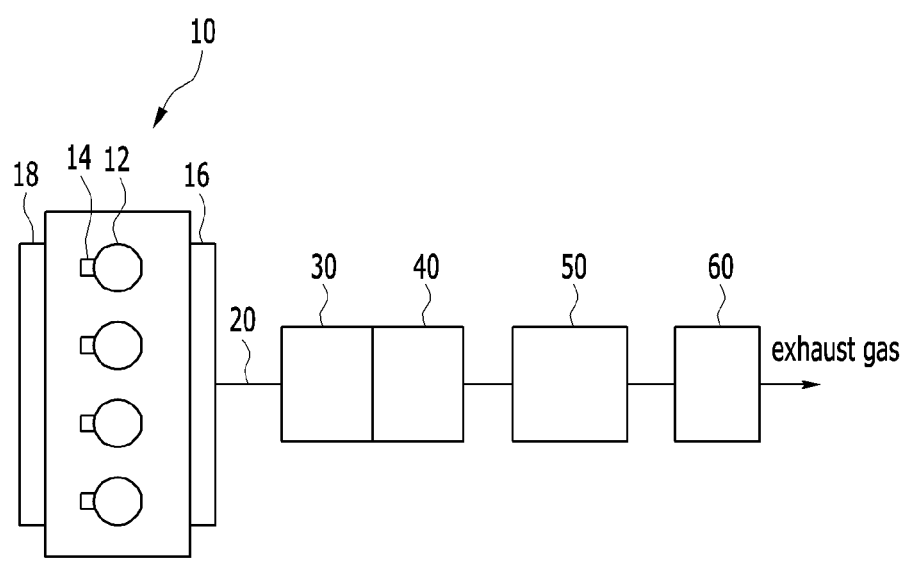
FIG. 1 is a schematic diagram of an apparatus for purifying an exhaust gas according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Parts which are not related to the description are omitted for clearly describing the exemplary embodiments of the present disclosure, and like reference numerals refer to like or similar elements throughout the specification.

In the following description, dividing names of components into first, second and the like is done to divide the names because the names of the components are the same as each other and an order thereof is not particularly limiting.

FIG. 1 is a schematic diagram of an apparatus for purifying an exhaust gas according to an exemplary embodiment of the present disclosure.

As shown in FIG. 1, an apparatus for purifying an exhaust gas according to an exemplary embodiment of the present disclosure may include an engine 10, an exhaust pipe 20, a first lean NOx trap (LNT) 30, a particulate filter 40, a second LNT 50 and a selective catalytic reduction (SCR) catalyst 60.

The engine 10 burns an air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may instead be used. In a case that the gasoline engine is used, the air/fuel mixture flows into the combustion chamber 12 through the intake manifold 16, and a spark plug (not shown) may be mounted at an upper portion of the combustion chamber 12. In addition, if a gasoline direct injection (GDI) engine is used, the injector 14 may be mounted at the upper portion of the combustion chamber 12.

The exhaust pipe 20 is connected to the exhaust manifold 18 so as to exhaust the exhaust gas to the exterior of a vehicle. The first LNT 30, the particulate filter 40, the second LNT 50 and the SCR catalyst 60 may be mounted on the exhaust pipe 20 so as to remove particulate matter and nitrogen oxide (NOx) contained in the exhaust gas.

The first LNT 30 is mounted on the exhaust pipe 20 downstream of the engine 10. The first LNT 30 absorbs the NOx contained in the exhaust gas at a lean air/fuel ratio, releases the absorbed NOx at a rich air/fuel ratio and reduces the nitrogen oxide contained in the exhaust gas or the released NOx or to generate ammonia ($NH_3$). In addition, the first LNT 30 oxidizes carbon monoxide (CO) and hydrocarbons (HC) contained in the exhaust gas.

Herein, the hydrocarbon represents all compounds consisting of carbon and hydrogen contained in the exhaust gas and the fuel.

The first LNT 30 includes any one of alkali metals including K, Na, Li and Cs, alkaline earth metals including Ba and Ca, rare earth metals including Ir and La, and noble metals including Pt, Pd and Rh or a combination thereof. Particularly, the first LNT 30 includes the Ba.

The particulate filter 40 is mounted on the exhaust pipe 20 downstream of the first LNT 30 and traps particulate matter contained in the exhaust gas. Typically, the particulate filter 40 includes a plurality of inlet channels and outlet channels. Each of the inlet channels includes an end that is open and another end that is blocked, and receives the exhaust gas from the first LNT 30. In addition, each of the outlet channels includes an end that is blocked and another end that is open, and discharges the exhaust gas from the particulate filter 40. The exhaust gas flowing into the particulate filter 40 through the inlet channels enters the outlet channels through porous walls separating the inlet channels and the outlet channels. After that, the exhaust gas is discharged from the particulate filter 40 through the outlet channels. When the exhaust gas passes through the porous walls, the particulate matter contained in the exhaust gas is trapped.

Meanwhile, a pressure difference sensor may be mounted on the exhaust pipe 20. The pressure difference sensor detects a pressure difference between a front end portion and a rear end portion of the particulate filter 40, and transmits a corresponding signal to the controller. The controller may control the particulate filter 40 to be regenerated if the pressure difference detected by the pressure difference sensor is greater than a predetermined pressure amount. In this case, the injector 14 post-injects the fuel so as to burn the particulate matter trapped in the particulate filter 40.

The second LNT 50 is mounted on the exhaust pipe 20 downstream of the particulate filter 40. The second LNT 50 absorbs the NOx contained in the exhaust gas at the lean air/fuel ratio, releases the absorbed NOx at the rich air/fuel ratio, and reduces the NOx contained in the exhaust gas or the released nitrogen oxide or to generate the $NH_3$. In addition, the second LNT 50 oxidizes carbon monoxide (CO) and hydrocarbons (HC) contained in the exhaust gas.

The second LNT 50 includes any one of alkali metals including K, Na, Li and Cs, alkaline earth metals including Ba and Ca, rare earth metals including Ir and La, and noble metals including Pt, Pd and Rh or a combination thereof. Particularly, the second LNT 50 includes the Ba.

The SCR catalyst 60 is mounted on the exhaust pipe 20 downstream of the second LNT 50. The SCR catalyst 60 temporarily absorbs the NH3 generated at the first LNT 30 or the second LNT 50 and purifies the NOx contained in the exhaust gas by reacting the absorbed $NH_3$ with the NOx contained in the exhaust gas. This type of the SCR catalyst 60 is called a passive SCR catalyst 60.

The SCR catalyst 60 includes any one of a zeolite catalyst and a metal catalyst supported on the porous alumina or a combination thereof. The zeolite catalyst includes at least one element including Cu, Pt, Mn, Fe, Co, Ni, Zn, Cs and Ga ion-exchanged therein. At least one metal including Pt, Pd, Rh, Ir, Ru, W, Cr, Mn, Fe, Co, Cu, Zn and Ag may be supported on the porous alumina in the metal catalyst supported on the porous alumina.

Hereinafter, an operation of an apparatus for purifying an exhaust gas according to the exemplary embodiment of the present disclosure will be described in detail.

Figure 2:
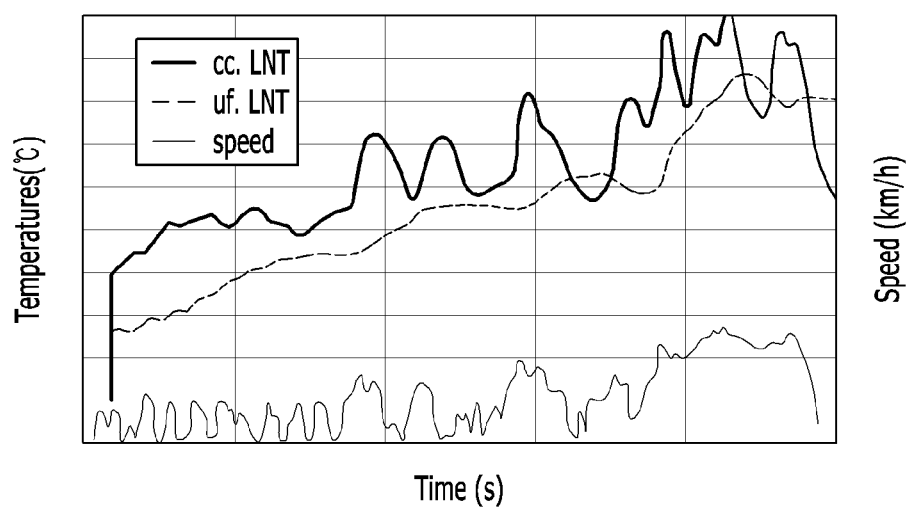
FIG. 2 is a graph illustrating a temperature of first and second LNTs when a vehicle is accelerated quickly or runs at a high load condition.

FIG. 2 is a graph illustrating a temperature of first and second LNTs when a vehicle is accelerated quickly or runs at a high load condition. A solid line represents a temperature of the first LNT 30 and a dotted line represents a temperature of the second LNT 50 in FIG. 2.

As described above, the first LNT 30 is disposed on the exhaust pipe 20 close to the engine 10 and the second LNT 50 is disposed on the exhaust pipe 20 far from the engine 10. Therefore, the temperature of the first LNT 30 may be higher than that of the second LNT 50 except possibly during deceleration driving. The second LNT 50 is positioned such that an average temperature of the second LNT 50 is lower than that of the first LNT 30 by 50-150° C. based on a temperature of the exhaust gas in the present exemplary embodiment. In this case, a desulfurization start temperature of the second LNT 50 is lower than that of the first LNT 40 by 50-150° C. For example, the desulfurization start temperature of the first LNT 30 may be 550° C. and the desulfurization start temperature of the second LNT 50 may be 650° C. If the desulfurization start temperature of the first LNT 30 is the same as that of the second LNT 50, the second LNT 50 cannot be desulfurized when desulfurization of the first LNT 30 starts. In addition, if desulfurization of the second LNT 50 starts, the first LNT 30 may be heat-degraded. In order to solve such problems, the desulfurization start temperature of the second LNT 50 is designed to be lower than that of the first LNT 30 by 50-150° C. For this purpose, a barium amount in the second LNT 50 may be 75% of that in the first LNT 30, or less.

Figure 3:
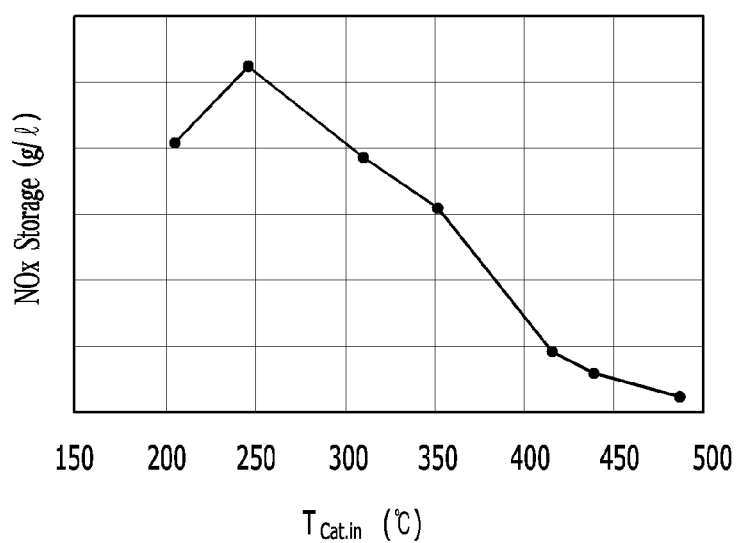
FIG. 3 is a graph illustrating NOx absorption in an LNT versus temperature according to embodiments of the present disclosure.

FIG. 3 is a graph illustrating NOx absorption in an LNT according to temperature.

As shown in FIG. 3, the LNT can absorb the most NOx at a region around 250° C. NOx absorbing capacity of the LNT may become deteriorated if the temperature rises above 250° C. and may be very small if the temperature is higher than or equal to 400° C.

As described above, since the average temperature of the second LNT 50 is lower than that of the first LNT 30 by 50-150° C., the first LNT 30 purifies the NOx contained in the exhaust gas if the temperature of the exhaust gas at an outlet of the exhaust manifold 18 is lower than or equal to 350° C. and the second LNT 50 purifies the NOx contained in the exhaust gas if the temperature of the exhaust gas at the outlet of the exhaust manifold 18 is within 300-500° C. In addition, the SCR catalyst 60 purifies the NOx contained in the exhaust gas if the temperature of the exhaust gas at the outlet of the exhaust manifold 18 is within 150-500° C. In addition, the SCR catalyst 60 subsidiarily removes the NOx that is not purified at the first and second LNTs 30 and 50. Particularly, even though the vehicle is quickly accelerated or runs at a high load condition and the temperature of the exhaust gas rises, the second LNT 50 and the SCR catalyst 60 far from the engine 10 purifies the NOx.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for purifying an exhaust gas comprising:
    an engine for generating power by burning a mixture of air and fuel and exhausting the exhaust gas generated during a combustion process to the exterior thereof through an exhaust pipe;
    a first lean NOx trap (LNT) mounted on an exhaust pipe downstream of the engine, and adapted to absorb nitrogen oxide (NOx) contained in the exhaust gas at a lean air/fuel ratio, to release the absorbed NOx at a rich air/fuel ratio, and to reduce the NOx contained in the exhaust gas or the released NOx using a reducing agent including carbon or hydrogen contained in the exhaust gas or to generate ammonia ($NH_3$);
    a second LNT mounted on the exhaust pipe downstream of the first LNT, and adapted to absorb the NOx contained in the exhaust gas at the lean air/fuel ratio, to release the absorbed NOx at the rich air/fuel ratio, and to reduce the NOx contained in the exhaust gas or the released NOx using the reducing agent including carbon or hydrogen contained in the exhaust gas or to generate the $NH_3$; and
    a selective catalytic reduction (SCR) catalyst mounted on the exhaust pipe downstream of the second LNT, and adapted to temporarily absorb the $NH_3$ generated at the first LNT or the second LNT and to reduce the NOx contained in the exhaust gas by reacting the absorbed $NH_3$ with the NOx contained in the exhaust gas,
    wherein the second LNT is positioned such that an average temperature of the second LNT is lower than that of the first LNT by 50-150° C. based on an average temperature of the exhaust gas.

2. The apparatus of claim 1, wherein a desulfurization start temperature of the second LNT is lower than that of the first LNT.

3. The apparatus of claim 2, wherein the desulfurization start temperature of the second LNT is lower than that of the first LNT by 50°-150° C.

4. The apparatus of claim 3, wherein the first and second LNTs include barium Ba, and
    a barium amount in the second LNT is 75% of that in the first LNT or less.

5. The apparatus of claim 1, wherein the first and second LNTs include any one of alkali metals including K, Na, Li and Cs, alkaline earth metals including Ba and Ca, rare earth metals including iridium Ir and La, and noble metals including Pt, Pd and Rh or a combination thereof.

6. The apparatus of claim 1, wherein the SCR catalyst includes any one of a zeolite catalyst and a metal catalyst supported on a porous alumina or a combination thereof.

7. The apparatus of claim 6, wherein at least one element including Cu, Pt, Mn, Fe, Co, Ni, Zn, Cs and Ga is ion-exchanged in the zeolite catalyst.

8. The apparatus of claim 6, wherein at least one metal including Pt, Pd, Rh, Ir, Ru, W, Cr, Mn, Fe, Co, Cu, Zn and Ag is supported on the porous alumina in the metal catalyst supported on the porous alumina.

9. The apparatus of claim 1, further comprising a particulate filter mounted on the exhaust pipe between the first LNT and the second LNT, and the particulate filter is adapted to trap particulate matter contained in the exhaust gas.

* * * * *